United States Patent [19]

Beck

[11] 4,117,202
[45] Sep. 26, 1978

[54] SOLAR POWERED BIOLOGICAL FUEL CELL

[76] Inventor: Timothy A. Beck, 723 Eighth Pl., Hermosa Beach, Calif. 90254

[21] Appl. No.: 806,362

[22] Filed: Jun. 14, 1977

Related U.S. Application Data

[63] Continuation-in-part of Ser. No. 741,455, Nov. 12, 1976, abandoned.

[51] Int. Cl.$^2$ ............................................. H01M 8/16
[52] U.S. Cl. ......................................... 429/2; 429/111
[58] Field of Search ............................................ 429/2

[56] References Cited

U.S. PATENT DOCUMENTS

| | | | |
|---|---|---|---|
| 3,228,799 | 1/1966 | Rohrback | 429/2 |
| 3,331,705 | 7/1967 | Davis et al. | 429/2 |
| 3,340,094 | 9/1967 | Helmuth | 429/2 |
| 3,477,879 | 11/1969 | Sisler | 429/2 |
| 3,811,950 | 5/1974 | Avampato | 429/2 |

Primary Examiner—John H. Mack
Assistant Examiner—H. A. Feeley
Attorney, Agent, or Firm—Jessup & Beecher

[57] ABSTRACT

A solar powered biological fuel cell is provided which is capable of generating a direct electric current in response to incident solar energy. The cell includes a suspension of mesophyll cells isolated from Digitaria sanguinalis (crab grass), malic enzyme, a nicotinamide adenine dinucleotide, a xanthine oxidase enzyme, a potential mediator such as benzyl viologen or methylene blue, and a catalyst such as pyruvate in an aqueous solution; and an appropriate electrode assembly.

10 Claims, 1 Drawing Figure

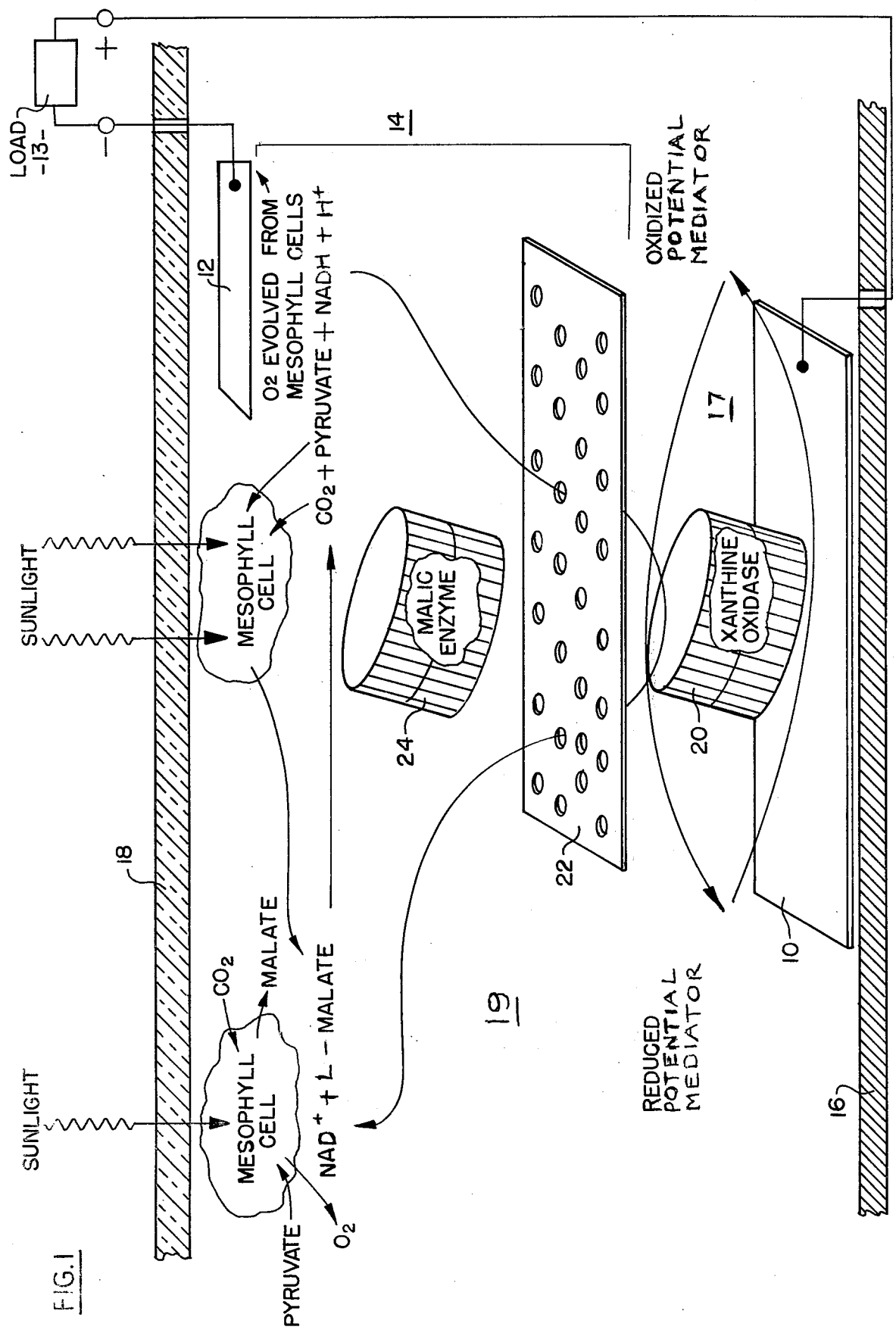

SOLAR POWERED BIOLOGICAL FUEL CELL

This application is a continuation-in-part of copending application Ser. No. 741,455, filed Nov. 12, 1976, now abandoned.

BACKGROUND OF THE INVENTION

A fuel cell is an electric cell that converts the chemical energy of a fuel directly into electric energy in a continuous process. The efficiency of this conversion can be made much greater than that obtainable by thermal-power conversion. In the latter the chemical reaction is made to produce heat by combustion. The heat is then transformed partially into mechanical energy by a heat engine, which drives a generator to produce direct current.

Although, in principle, the nature of the reactants is not limited, the fuel-cell reaction usually involves the combination of hydrogen with oxygen, as shown by Equation (1). At 25° C. and 1 atmosphere pressure, that is, standard temperature and pressure (STP), the reaction takes place with a free energy change ($\Delta G$) of $\Delta G = 056.69$ kcal/mole, that is, 237,000 joules/mole water.

$$H_2(g) + \tfrac{1}{2}O_2(g) \rightarrow H_2O(\ell) \qquad (1)$$

If the reaction is harnessed in a galvanic cell working at 100% efficiency, a cell voltage of 1.23 volts results. In actual service such cells have shown steady-state potentials in the range 0.9–1.1 volts, with reported coulombic efficiencies of the order 73–90%.

Fuel cells are of 200–500 watts capacity and 50–100 ma/cm² current density. Larger prototypes have been produced, some as large as 15 kw capacity.

The most successful prior art type is the $H_2$—$O_2$ fuel cell of the direct or indirect type. In the direct type, hydrogen and oxygen are used as such, the fuel being produced in independent installations. The indirect type, employs a hydrogen-generating unit which can use as raw material a wide variety of fuel. The reaction taking place at the anode is as in Eq. (2), and at the cathode as in Eq. (3).

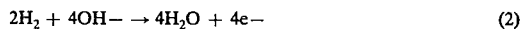
$$2H_2 + 4OH^- \rightarrow 4H_2O + 4e^- \qquad (2)$$

$$O_2 + 2H_2O + 4e^- \rightarrow 4OH^- \qquad (3)$$

Because of the low solubility of $H_2$ and $O_2$ in electrolytes, the reactions take place at the interface electrode-electrolyte, requiring a large area of contact for a large electron flow. This is obtained with porous materials called upon to fulfill the following main duties: The materials must provide contact between electrolyte and gas over a large area, catalyze the reaction, maintain the electrolyte in a very thin layer on the surface of the electrode, and act as leads for the transmission of electrons.

Sun powered photosynthetically-driven biological fuel cells are also known to the prior art. In U.S. Pat. No. 3,477,879, a device is described in which an electrical fuel cell is formed by using two chambers, one placed in sunlight and supplied with nutrients and microorganisms which transfer light energy or photons into chemical energy in the form of algae or carbohydrate, and the other placed in the dark where the chemical energy is released by reducing bacteria which produces compounds which release electrons. A bridge is included in the device to provide a pathway for cations and anions without a transfer of material between chambers. Electrons are released to an anode of the device by sulfites generated from sulfates by bacterial action. The energy of this action is derived from the sun and stored as bacterial metabolites, these being fed to the bacteria to drive the reduction reactions generating compounds which, in turn, give up electrons to an electrode element.

The optimal condition for a photosynthetically-driven fuel cell would be one in which the cells collecting sunlight had as their genetic-based biochemical directive that most of the photonic energy captured within the chloroplasts of the cells (assuming eucaryotic cells are used rather than photosynthetic bacteria or blue-green algae) would be exported from within the living cells to outside of the cell organism, where it could be acted upon without further catabolism by any other organism to produce electrons with a negative standard reduction potential as close as possible to hydrogen (−0.42 volts).

Work with chloroplast preparations has shown that it is possible to produce molecular hydrogen with certain enzymes in the absence of appreciable oxygen tensions from sunlight.

Oxygen (+0.82 volts) produced by the water-splitting activity of photosynthesis would consititute a readily-available source of oxidant, and should be thought of as the oxidant of choice for accepting electrons at the cathode, whether the cathode is separated from the living cells to which oxygen is delivered, or is spatially set among the cells to which oxygen diffuses.

In photosynthesis, four photons captured by a chlorophyll pigment system with an average energy of approximately 50 Kcals per einstein are needed to reduce one molecule of nicotinamide adenine dinucleotide phosphate (NADPH) at approximately 53 Kcals per mole. Therefore, the theoretical maximum conversion of photonic energy to reducing potential is approximately 25%. Tapping the energy as formed into carbohydrate leads to another reduction in the theoretical efficiency. The actual efficiency of photosynthesis in nature for recovered energy in fixed carbon for a field of sugar cane, one of the most efficient species, is as high as eight percent.

A cell type which approaches these model characteristics was first described in the prior art as a type of cell living within the leaves of certain highly photosynthetically-efficient tropical plants such as crab grass or sugar cane. In the field of plant physiology, what is termed Kranz-type leaf anatomy has been described in the prior art in which the vascular bundles are surrounded by two concentric chlorophyllous layers, thereby forming an inner parenchyma bundle sheath layer and an outer mesophyll layer. It has also been found that these species with Kranz-type leaf anatomy also fix carbon dioxide into four carbon compounds such as oxaloacetate, aspartate or malate, rather than by Calvin cycle type $CO_2$ condensation with ribulose bisphosphate. These species are described as "$C_4$" type plant species. "$C_4$" plant species are further segregated into what are termed "malate formers" or "aspartate formers" depending upon which compound appears to be the major immediate product of carbon fixation.

It was also noted in the prior art that this newly-discovered mode of carbon dioxide formation was associated with Kranz-type leaf anatomy. Further investigation revealed that the mesophyll cell type was responsible for the carbon dioxide fixation reaction, and that this cell was thought to transport carbon dioxide and reducing equivalent derived from the sun to the neighboring bundle sheath cell type. The mesophyll cells collect carbon dioxide and sunlight, while the bundle sheath cells specialize in carbohydrate formation from the carbon dioxide and energy in malate which is transported to the bundle sheath cells. Another prior art finding is that mesophyll cells from $C_4$ species have reduced photo-respiration rates which, in other plant species, use up energy and reduce the overall conversion efficiency of the energy in photons to energy in chemical bonds. The $C_4$ plants also are more efficient users of solar energy at high light intensities than plant species using the first discovered means of carbon dioxide fixation, such as spinach.

Recent investigations in the field of plant physiology have demonstrated that mesophyll cells, from what are termed "$C_4$ malate formers" in the scientific literature, have the possibility of producing extracellular reducing equivalents at the level of malate which can be transported through a series of oxidation and reduction reactions to an inert electrode. A suspension of mesophyll cells isolated from the leaves of these species export malate and absorb pyruvate and $CO_2$. The oxygen (+0.82 volts) produced from the water-splitting activity in photosynthesis can be used to accept electrons at a cathode.

Within "$C_4$" type mesophyll cells, the NADPH formed in the chloroplast is used to reduce oxaloacetate to malate which is transported to bundle sheath cells which in nature lie next to mesophyll cells in the leaf. By eliminating the bundle sheath cells and using malic enzyme, malate can be oxidatively decarboxylated to pyruvate which is then shuttled back to the mesophyll cell and serves as a precursor of phosphoenol pyruvate production and, hence, malate formation with the mesophyll cell. Thus, we are able to interdict the normal flow or reducing equivalents at the NADPH (−0.32 volts) level and use the energy to produce a current of electons. By the use of malic enzymes (L-malate: $NAD^+$ or $NADP^+$ oxidoreductase (decarboxylating) EC 1.1.1.38 or EC 1.1.1.40), the extracellular malate can be converted to $CO_2$ and pyruvate as two electrons are transferred to reduce a nicotinamide adenine dinucleotide [NAD((P)H].

The technology for transferring electrons from extracellular NADPH to the electrode element of a fuel cell has been demonstrated in the prior art, using a potential mediator substance (benzyl viologen) to transfer electrons from NADPH to an electrode to measure the standard reduction potential of the $NADPH/NADP+$ couple. It was found that xanthine oxidase was necessary to catalyze the reaction. Other workers in the art have used other flavoprotein NADH and NADPH dehydrogenases to catalyze the transfer of electrons from these two compounds (NADH and NADPH) through various reducible dye intermediates and other reducible compounds, such as quinone, which serve as potential mediator compounds for delivery of electrons to an inert electrode.

Methyl phenazonium methosulphate and similar compounds have also been used to transfer electrons from the nicotinamide adenine dinucleotide and the phosphate analog, NADPH, directly to a fuel cell electrode without the necessity of an intervening enzyme step. Malate coming from $C_4$ mesophyll cells in some way must be made to give up electrons and form pyruvic acid (as in the case of malate, pyruvic acid is the acid form of pyruvate; the form is dependent upon the hydrogen ion concentration of the surrounding environment), which is reabsorbed by mesophyl-cells and serves as a precursor to malate formation within the mesophyll cell. Malic enzymes ((L-malate: $NAD^+$ oxidoreductase (decarboxylating) EC 1.1.1.38 and EC 1.1.1.40) are known to exist in multiple forms. It can be isolated from bundle sheath cells from $C_4$ type plants, lactobacillus bacteria, cactus, or other species. Malic enzyme catalyzes the following reversible reactions:

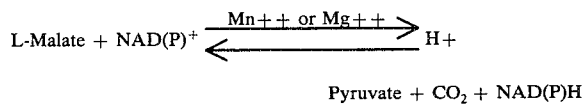

$$\text{L-Malate} + \text{NAD(P)}^+ \underset{\longleftarrow}{\overset{Mn^{++} \text{ or } Mg^{++}}{\longrightarrow}} H^+$$

Pyruvate + $CO_2$ + NAD(P)H

The equilibrium constant favors malate formation when $CO_2$ is at a pressure of 760 mm of Hg and is $5 \times 10^{-2} \text{mole}^{-1}$. Pyruvate and $CO_2$ are taken up by mesophyll cells, and $NAD^+$ or $NADP^+$ is reformed as NADH or NADPH gives up electrons which find their way to an electrode; thus, the reaction can be made to go toward malate oxidation as the products of the reaction are removed as current flows through the circuit. As previously mentioned, there are several methods to transfer electrons from the nicotinamide adenine dinucleotides to the fuel cell electrode. An important consideration in the transport of the two electrons from NADH or NADPH to an electrode assembly is that the xanthine oxidase catalyze step as well as the donation of electrons step at the surface of the electron accepting electrode assembly must be conducted in the absence of high oxygen tension in the aqueous solution because oxygen can serve as the electron acceptor at both of these reaction surfaces. Methyl phenazonium methosulphate is also susceptible to oxidation by molecular oxygen.

Tissue culture technology has progressed so that the means of growing and maintaining cultures of cells of the mesophyll cell types has evolved. When furnished with the right concentrations of inorganic salts and organic growth-stimulating subtances, mesophyll cells have been kept autotrophic for extended periods as described in the prior art.

Enzymes used in the biological fuel cells under consideration must be kept from proteolytic attack by bacterial agents contaminating the suspension of living mesophyll cells for an extended function of the device. This may be achieved by using polyacrylamide cross-linked polymers or other polymeric compounds capable of forming a clathrate type molecular cage around the protein enzyme. Covalent linkage of the malic enzyme to the lattice structure may or may not be necessary depending upon compounds and techniques employed. If a second enzyme is employed to transfer electrons from the reduced nicotinamide adenine dinucleotide to a potential mediator substance, this protein also should be enclosed within a protective element.

The mesophyll cells can be isolated from what are termed $C_4$malate-forming species of plants by either enzymatic methods, as described by Jense, Plant Physiol. 48 9–13, 1971, or Gnanam and Kulandaivelu, Plant Physiology 44: 1451–1456, 1969, and adapted toward separating $C_4$ mesophyll cells by various plant physiologists or grinding techniques as employed by Edwards and Black, Plant Physiology 47: 149–156, 1971, can be used to free mesophyll cells from other cells of the leaf such as bundle sheath cells. Single mesophyll cells of Digitaria sanguinalis are approximately 15-25 u meters in diameter and can be separated from the other cell types by passage of solution containing the cells through nylon filtration net, of approx. 30 u meters pore size, which passes mesophyll cells but not bundle sheath cells and bundle sheath strands of cells. Mesophyll cells can be separated from chloroplasts and broken cell fragments and most bacteria by catching the cells on a 10 u meters net. Further purification of mesophyll cell cultures and the development of a culture from a single mesophyll cell used to clone the mesophyll cells used for the invention is within the technology. Best results are achieved when cells are isolated from the leaves of plants with seeds surface sterilized in 1.8% $NaClO_4$ (sodium hypochlorite, bleach) for 10-15 minutes and germinated and grown on sterile agar containing essentials salts such as Hogalands salts, or commercial hydroponic garden salts.

The present invention is concerned with an improved type of photosynthetically-driven biological fuel cell. The invention relates specifically to a biological fuel cell for transducing the energy in sunlight quanta into a useable direct electric current. This is achieved by the action of sunlight upon living cells whose genetic makeup and differentiation dictate that the cells will export to the extracellular space a large fraction of the reducing equivalents generated by sunlight in the chloroplasts of the cells. The fuel cell of the invention uses photosynthetic cells isolated from the leaves of Digitaria sanguinalis (crabgrass); however, mesophyll cells from any "$C_4$" type photosynthetic plant species may be used in which malate (malic acid) serves as the medium of transfer of reducing equivalents between mesophyll cells and naturally occurring neighbor cells (called bundle sheath cells).

BRIEF DESCRIPTION OF THE DRAWING

FIG. 1 is a schematic representation of a biological fuel cell incorporating the concepts of one embodiment of the invention.

DETAILED DESCRIPTION OF THE ILLUSTRATED EMBODIMENT

The invention consists of a first anaerobic anode electrode 10 and a second aerobic cathode electrode 12 which are immersed in a growth chamber 19 having a bottom 16 and a transparent top 18. The electrodes 10 and 12 are connected to an external load 13. Electrode 12 may be formed of platinum metal, and it may be coated with Teflon, or other electrode protective agent. Mesophyll cells isolated from or grown from the isolated cells of a "$C_4$" type photosynthetic species plant, such as Digitaria sanguinalis, are suspended in a nutrient aqueous solution in chamber 19, and a system of catalysts and potential mediators are also suspended in the solution to transfer electrons from malate which is produced by the cells to the electrode 10.

As sunlight impinges upon the mesophyll cells through transparent top 18, chloroplasts use the light energy to split water (photosystem II activity also known as the Hill reaction) thus generating molecular oxygen which is consumed to form $OH^-$ ions at electrode 12 which migrate along pathway 14 to the anaerobic region 17. The growth chamber 19 in which the mesophyll cells are maintained in the living state can be tubular, such as glass pipe, or flat covering area, such as a shallow pond with a transparent sunlight transmitting top 18, such as shown in FIG. 1.

The nutrient water solution within the growth chamber 19 may approximate that of Chandler, Marsac and Kouchkovsky (Can. J. Bot. 50: 2265-2270) or Murashige and Skoog Salts (GIBCO) that is, it may be of a type which is capable of sustaining isolated cells in an autotrophic state. Pyruvic acid at approximately 5m molar ($5 \times 10^{-3}$ m) concentration is needed to initiate malate export to the extracellular space by the mesophyll cells under illumination.

The L-malate (the anion of malic acid) that the cells produce is acted upon by malic enzyme (L-malate: $NAD(P)^+$ oxidoreductase (decarboxylating) EC 1.1.1.38 or EC 1.1.1.40), purified by known means. The malic enzyme is incorporated into a lattice structure 24 of a polymeric compound, such as polycrylamide, or other clathrate producing polymer. The lattice serves to protect the enzyme from enzymatic degradation, loss through surface denaturation, and loss through solubility. The purpose of the reaction of malate and $NAD^+$ or $NADP^+$ is to yield carbon dioxide, pyruvate and a reduced compound, NAD (P) H.

As is characteristic of mesophyll cells from "$C_4$" photosynthetic species of plants with Kranz-type leaf anatomy, these cells absorb the pyruvate and carbon dioxide which are products of the malic enzyme catalysized reaction. The export of reducing equivalents being produced from sunlight within the cells is dependent upon pyruvate and $CO_2$ uptake of the cells. Over time malate production appears stoichiometrically coupled to pyruvate uptake on a one to one basis.

The NADH formed by the action of malic enzyme (there are also forms of malic enzyme which react with $NADP+$) upon malate is used to donate two electrons to a compound termed a potential mediator substance, such as benzyl viologen or methylene blue, which in turn give up electrons to the anode 10 which has a relatively large surface area. Most potential mediator compounds are reducable dye compounds such as methylene blue, benzyl viologen or methyl viologen. Quinone is also mentioned as a potential mediator substance. $NAD^+$ or $NADP^+$ is thus regenerated, as NADH or NADPH gives up its two electrons ($-0.32$ volts) to the potential mediator substance. This potential mediator step can be catalyzed by the action of xanthine oxidase with benzyl viologen, or methylene blue. The reaction at xanthine oxidase must be conducted in the absence of oxygen because xanthine oxidase will cause NADH or NADPH to give up electrons to oxygen directly thus short circuiting operation of the fuel cell.

There are several means by which an anerobic region can be generated in front of anode 10 so that the xanthine oxidase step and the electron donation step to anode 10 can be protected from energy-using oxygen consumption. One method is to place part of a chamber divider 22 over or in front of the electron accepting electrode 10. The chamber divider 22 is porous to ions and solute molecules; but is not porous to cells. It may or may not in part be used to consume oxygen by electrochemical means. The divider 22 aids in creating an anaerobic region near anode 10 and reducing electrode poisoning by protein adsorption. It may be composed of one or more substances such as a metal and filtration substance.

Another method for generating the anaerobic region in front of anode 10 is to harvest energy from the fuel cell at night, or in the dark, so that the mesophyll cells themselves will contribute to the generation the anaerobic region through their own respiration, which consumes oxygen at a rate of about 5% of the rate of their oxygen generating capacity in the light. Most of the oxygen generated by the cells floats to the surface of the growth chamber and can be removed from the aqueous interface by pumping.

A combination of the aforesaid three methods, or other methods, can be used to remove dissolved oxygen from contact with the anode 10 and xanthine oxidase. One such method, for example, is to bubble a gas, such as nitrogen or helium through the solution to sweep out most of the oxygen. Methyl phenazonium methosulfate or analog compounds which non-enzymatically transfer electrons from the nicotinamide adenine dinucleotides (NADH or NADPH) are also oxidizable and must be protected from unwanted oxidations.

If an enzyme proves necessary to catalyze any step, optimally, it should also be insoluablized and protected from denaturation by incorporation also into a lattice structure 20. If a potential mediator substance is used that does not need an enzyme catalysis; this enzyme step may be eliminated. On large volume systems employing mesophyll cells to produce oxidizable malate, the replacement of decaying catalytic activity from enzymes needed for electron shuttle steps could prove costly.

The reduced form of the potential mediator substance yields electrons to the anode 10 which is located within the solution 19 containing the cells. As the reduced potential mediator gives up electrons to the anode 10, the mediator becomes oxidized and is then capable of transporting more electrons to the anode.

The cathode 12 can operate on an alternate oxidant, but since oxygen is produced by mesophyll cells, and since oxygen is readily available in an earth atmosphere, oxygen is used for an oxidant. Oxygen bubbles formed during illumination of the mesophyll cells float to the surface of the growth chamber 19 due to gravity and are used to furnish oxygen to the surface of cathode 12 at a partial pressure of approximately one atmosphere, or air can be used. In systems where the cathode is set away from the cell suspension it operates optimally in a solution of 32 w/o KOH or NaOH at 80° C., but will operate in less basic conditions and cooler temperatures.

The foregoing action produces a potential difference across the electrodes 10 and 12 which causes an electrical current to flow through the load 13. The reason that current flows is because of a potential difference caused by accummulating malate in solution or gell stoichiometrically reacts with NAD+ to produce the reduced form (NADH), as the malate molecule reacts with enzyme and NAD+ cofactor complex. NADH has a half cell potential of $-0.32$ volts. Unless NAD+ is present the malate-using reaction will come to a stop far from equilibrium ($\Delta G = 0$) due to kinetics. Only during circuit closure and subsequent current flow through load 13 is the NAD+ cofactor formed. Malate is stable in solution unless acted upon by enzyme and cofactor complex. Stoichiometrically for each coulomb of electrons which react with oxygen ($O_2$) at the cathode 12, 5 micromoles of oxidized benzyl viologen or comparable electron acceptor is generated in the anerobic region near anode 10 (assuming two electrons donated per molecule of potential mediator oxidized).

During operation of the fuel cell of the invention, the rate of carbon dioxide fixation by the mesophyll cells sets the theoretical limit of malate formation within the cells, and hence the amount of malate that can be expected to be exported from the cells. During steady state operations the rate of malate export has been found to be somewhat less than the rate of pyruvate uptake, although the rate of pyruvate uptake appears to be equal to the rate of $CO_2$ fixation. The rate of malate utilization is coupled to pyruvate formation and NADH formation by the malic enzyme step. NADH formation from NAD+ is stoiciometrically coupled on a one-to-one basis with malate utilization. Malate will accumulate in the growth chamber without NAD+ and malic enzyme. The oxidized form of the potential mediator substance is reformed at the anode 10 as the reduced form gives up electrons. As the reduced form of NADH, or the potential mediator substance, gives up electrons, the oxidized form is thus regenerated, thereby being able to shuttle two more electrons in cycle form.

By the use of mesophyll cells, isolated and grown from "$C_4$" type photosynthetic plants species, such as Saccharum or Digitaria, a nearly closed system can be achieved, where the net effect is that sunlight is used by the cells to split water during photosynthesis. The electrons taken from water eventually find their way back into water after traveling through a circuit of approximately 1 volt potential difference between electrode 10 and 12 and doing work. Intermediate compounds in the system participate as catalysts.

CAM plant species, "CAM" standing for Crassulacean acid metabolism, named for a family of cactus or succulents, may be used to form the mesophyll cells; in which a type of carbon dioxide fixation similar to that described for $C_4$ plant species occurs, except that the cycle is internalized within a single cell and operates between the vacuole of the plant cell and the cytoplasm. Malate is stored in the vacuole. Massive (100–200 ueg $g^{-1}$ fresh weight) amounts of malate are produced during the dark (from energy captured during the day) by these cells. Malate can be made to leak from cells by (1) osmotic shock; (2) use of agents such as DMSO (dimethyl sulfoxide) which are known for increasing the permeability of biological membranes; and (3) detergents in low concentrations such as Triton X-100.

While a particular embodiment of the invention has been shown and described, modifications may be made, and it is intended in the appended claims to cover all embodiments which come within the spirit and scope of the invention.

What is claimed is:

1. A photosynthetically-driven biological fuel cell comprising: means forming a growth chamber having a transparent top exposed to sunlight; a nutrient aqueous solution contained in said growth chamber; an anode electrode and a cathode electrode mounted in said growth chamber immersed in said solution in isolated relationship with one another and electrically connected to an external load; a plurality of isolated mesophyll cells suspended in said nutrient aqueous solution, said mesophyll cells producing malate when illuminated by sunlight, said nutrient solution being capable of sustaining the isolated mesophyll cells in an autotropic state and of initiating malate export from the illuminated mesophyll cells into the solution; a selected substance suspended in said nutrient solution to act on the malate to form NADH; and a potential mediator substance suspended in said nutrient solution to transfer electrons from said NADH to said anode.

2. The biological fuel cell defined in claim 1, and which includes a catalyzing substance suspended in the nutrient solution for catalyzing the action of said potential mediator.

3. The biological fuel cell defined in claim 2, and which includes means creating an anaerobic region in the vicinity of said anode to protect the catalyzing step from energy-using oxygen consumption.

4. The biological fuel cell defined in claim 1, in which the isolated mesophyll cells are obtained from a substance selected from a class consisting of CAM plant species and C4 type photosynthetic plant species.

5. The biological fuel cell defined in claim 1, in which said selected substance is malic enzyme.

6. The biological fuel cell defined in claim 1, in which said potential mediator compound is selected from a class consisting of methylene blue, benzyl viologen and methyl viologen.

7. The biological fuel cell defined in claim 2, in which said catalyzing substance is xanthine oxidase.

8. The biological fuel cell defined in claim 3, in which said means creating an anaerobic region comprises a divider member porous to ions and solute molecules but impervious to mesophyll cells.

9. The fuel cell defined in claim 1, and which includes means in said nutrient solution to initiate malate export from the illuminated mesophyll cells to the solution.

10. The fuel cell defined in claim 9, in which said last-named means comprises pyruvic acid at approximately 5m molar ($5 \times 10^{-3}$m) concentration.

* * * * *